United States Patent Office 2,730,457
Patented Jan. 10, 1956

2,730,457

PRESSURE RESPONSIVE RECORD MATERIALS

Barrett K. Green and Lowell Schleicher, Dayton, Ohio, assignors to The National Cash Register Company, Dayton, Ohio, a corporation of Maryland No Drawing. Application June 30, 1953,
Serial No. 365,292

13 Claims. (Cl. 117—36)

This invention relates to pressure-sensitive record material, and more particularly pertains to a record material base having a surface or surfaces on which are adherent a profuse number of microscopic marking pressure-rupturable capsules of film-forming hydrophilic colloid material, each capsule containing a nucleus of liquid, which is, or carries, one of two substances reactant on contact to produce a distinctive color, and on which surface or surfaces, in proximity to the capsules, are adherent a profuse number of solid microscopic particles of the other color-reactant substance. Printing or writing pressures applied onto said surface or surfaces rupture the capsules in the locality of the pressure, releasing the liquid nuclei, so that they may migrate and contact the nearby solid particles of the other solid color-reactant substance, thus producing distinctively colored printing or writing marks. The novel record material is an improvement over that shown in United States Patents Nos. 2,548,364; 2,548,365; 2,550,470; 2,550,471; 2,550,472; and 2,550,473, which issued on the joint applications of applicant Barrett K. Green and Robert W. Sandberg, in that in the patents there was disclosed record material in which oily liquid droplets of marking fluid were not contained in individual capsules but were present as entrapped in a continuous dried film of hydrophilic colloid material derived from an emulsion of oil in a colloid sol, which, as is common to all hydrophilic colloid material films, is subject to cracking or crazing, due to environmental conditions or to mishandling, and in which the structure on the interior of the film is somewhat sponge-like. This condition of cracking and sponge-like texture causes the liquid to escape prematurely, leaving the record material inadequate for its purpose, as the reaction with the solid material in proximity therewith causes discoloration of the sheet as a whole. This weakness in the pressure-sensitive record material of the mentioned patents is overcome in the present record material, which has the oily liquid contained in microscopic pressure-rupturable capsules, which have been made with dense walls to render them non-permeable to the liquid. Moreover, if cracks form in the continuous hydrophilic film of the record material of the patents, the cracks run right across the voids holding the liquid, releasing it. In the novel material of this invention, cracks formed in the coating by folding of the material, for instance, run between the capsules and not through them, so such cracks, caused by folding or mishandling of the paper, do not release the liquid. The capsules of this novel record material have been treated to harden and insolubilize the encapsulating hydrophilic colloid material, so that it is not subject to the disintegrating influences of humidity, of heat, or of the fluid used in coating processes by which it may be applied.

The capsular material used, which contains the color-reactant liquid, is so rugged that it may be interspersed with a fluid suspension of a solid particle material, so as to be applied to the paper as a single coating, in which the particles are interspersed in all directions without danger of premature formation of color. In other forms of the invention, to be described, the solid particles may be laid down as a first film on the paper by use of a binder, and the capsular material may be suspended in water and applied thereover and dried, or the capsular material may be applied in a water suspension and dried, and thereover may be coated the suspension of the solid color reactant particles.

The particular color reactants which are used in the preferred form of the invention require no ionizing medium to form the color, and the record material, therefore, may be moisture-free. If the color-reactant substance intended to be used in the capsules is a solid, it is dissolved or dispersed in the liquid, so that the mobility afforded by being in the liquid state will aid in the contact between the two color-reactant substances. In the preferred form of the invention, an inert colorless oil and colorless color-reactant substances are used in conjunction with a white clay-like material, so that the impression surface of the novel pressure-sensitive record material will be white, against which the distinctively colored marks, made by pressure, stand out.

The principal object of the invention is to provide a pressure-sensitive record material on which marks of distinctive color may be produced by the mere application of localized pressure, said material including color-forming substances of two kinds, one being solid and the other being an oily water-immiscible liquid, the two substances normally being held insulated from reaction contact by reason of the liquid reactant substance being contained within pressure-rupturable microscopic capsules of film-forming hydrophilic colloid material, the capsules each having the liquid as a nucleus and a dense shell-like wall deposited therearound by coacervate forces, and being rupturable by printing or writing pressures.

Another object of the invention is to provide such a record material in which the color-reactant substances are interspersed in all directions in a coating on a base web sheet.

Another object of the invention is to provide such a record material in which the two color-reactant substances are present on the base web sheet in proximate layers.

Further objects, and objects relating to the details and economies of production, will appear from the detailed description to follow. The objects of this invention have been obtained by several embodiments thereof, which will be described. The invention is clearly defined and pointed out in the specification.

In the preferred form of this invention, the base web of the record material is paper of the kind used for printing or writing, although the reactant substances may be coated on any base, such as metal, wood, plastic, or glass, as the flexibility and thinness found in paper are not characteristics needed to make the material responsive to the impact pressures of type or writing instruments.

In the preferred embodiment, there is first coated on the paper the solid particle reactant substance by use of binder materials, which leaves the surfaces of the reactant particles available for contact by the liquid which will be expressed from the ruptured capsules overlying said particles.

Of the preferred reactant materials employed, the liquid nuclei of the capsules contain an organic substance which is an electron donor automatic compound having a double-bond system, which is converted to a more highly polar conjugated form upon taking part in an electron donor-acceptor solid surface chemical reaction, giving it a distinctive color, and the solid particles are of an inorganic substance which is an acid relative to the organic substance, so as to be an electron acceptor when in adsorption contact therewith. The solid material is in fine particle form in order to furnish a large reactant surface per unit area of the record material, which condition enhances the depth of color produced by the printing or writing.

The solid adsorbent substance in the preferred form is attapulgite, although there may be substituted therefor, or mixed therewith, other kinds of adsorbent reactants, such as magnesium trisilicate and sodium aluminum silicate zeolite material.

The adsorbate substance may be or include one or more of the reactants of the phthalide type, such as crystal violet lactone, which is 3,3-bis-(p-dimethylaminophenyl)-6-dimethylamino phthalide, and malachite green lactone, which is 3,3-bis - (p - dimethylaminophenyl) phthalide. With such phthalide materials may be included an oxidizing colorless compound which oxidizes on the mentioned clay materials to form a color, the preferred one being benzoyl leuco methylene blue. The phthalide compounds react immediately to produce a color, but, like all triphenyl methane dyes, such instantly-produced colored marks tend to fade in the course of time, whereas the oxidizing compound does not change to the colored form for several hours or days and supports the fading instantly-produced color, so that the marks produced by the reactant liquid are permanent.

The preferred encapsulating material is gelatin or a complex of gelatin and gum arabic, although other gellable hydrophilic colloids, such as agar-agar, will do. As the total thickness of the pressure-sensitive coating need be no greater than from .001 to .002 of an inch, it may be supported on very thin paper stock. By placing a number of such thin-coated paper sheets in superimposed relation in a typewriter, a number of printed copies of typewritten material may be made without the use of a typewriter ink ribbon or of ordinary carbon manifold paper, as is now the common practice.

As it is difficult, if not impossible, to show the exact structure of this coating by the use of a drawing, none accompanies this specification. The method of preparing the preferred embodiment will next be described.

First, 20%, by weight, of paper coating starch in water is cooked at 200 degrees Fahrenheit for fifteen minutes and cooled to room temperature. Separately, one part, by weight, of attapulgite is dispersed in three parts, by weight, of water, by use of a ball mill or equivalent. Four parts, by weight, of the attapulgite dispersion is mixed with one part, by weight, of the starch solution. The resultant mixture is applied at room temperature to the paper and allowed to dry. This coating of attapulgite may be of the order of .0005 of an inch.

Next, to form the capsules, 20 grams of gum arabic is dissolved in 160 grams of water, and into the is emulsified 80 grams of trichlorodiphenyl containing 3% to 6%, by weight, of the two color-reactant materials 3,3-bis-(p-dimethylaminophenyl) 6-dimethylamino phthalide and benzoyl leuco methylene blue, preferably in equal amounts. The emulsion is carried on until the drop size of the oil is from 2 to 5 microns. Next, 20 grams of gelatin is dissolved in 160 grams of water and mixed with the emulsion. This gelatin preferably is made from pigskins and has a pH of 8 and a jelly strength of 275 grams, as measured by the Bloom gelometer. The pH of the mixture of colloid sols is adjusted to 6.5 with 20%, by weight, of sodium hydroxide in water. Three hundred grams of the so-adjusted mixture is diluted with 700 grams of water at 50 degrees centigrade, with agitation. The pH of the diluted mixture is then lowered to approximately 4.5 with 10%, by weight, of acetic acid in water, which causes coacervation resulting in the deposition of the colloid complex evenly and densely around each of the oil droplets individually. While still at 50 degrees centigrade, 2.19 grams of a 37% solution, by weight, of formaldehyde in water is added. No more than twenty minutes should elapse from the start of dilution to this point. Thereafter a gelation step is commenced by placing the mixture in an ice bath with agitation until it reaches 10 degrees centigrade. The pH then is adjusted to 9 with 20%, by weight, of sodium hydroxide in water to promote the hardening of the capsules. This material may be coated on paper without further water-adjustment, or its viscosity may be adjusted by adding water or removing it. At this stage, the colloid coating composition is a creamy white fluid. If a portion of this fluid is sparsely dispersed in water and placed under a microscope, it will be seen to consist of microscopic capsules of the hydrophilic complex colloid material, the individual capsules being several microns in diameter and containing one or more droplets of oil. When the material is of the right consistency, it is coated over the attapulgite coating by rollers, spray, brushes, or any other commonly-used methods of coating paper, and allowed to dry. This coating composition, consisting of microscopic capsules dispersed in water, is of such a nature that no additional binder material is required, it being adherent, by reason of its own tackiness, to the undercoating. This capsular coating, when dry, needs to be no more than that which make a four-pound coating on a ream of paper, the sheet size of which is 25 by 38 inches.

There may be substituted for the gum arabic-gelatin complex material, of which the encapsulating film is made, a single colloid material. In making up this capsular material from a single hydrophilic colloid material, one gallon of an oil-in-water emulsion of 20 parts, by weight, of trichlorodiphenyl containing the mentioned color reactants, and 100 parts, by weight, of a sol of 10%, by weight, of the aforementioned pigskin gelatin, in water, is prepared, the emulsifying continuing until the drop size of the oil is from 2 to 5 microns. This material is kept at 50 degrees centigrade to prevent the gelatin from gelling. With the temperature of the ingredients still kept at 50 degrees centigrade, coacervation then is induced by adding, slowly and uniformly, 4/10 of a gallon of 20%, by weight, of sodium sulphate in water. The uniform distribution of the salt solution is accomplished by continuous agitation.

To gel the coacervate, the heated coacervate mixture is poured into ten gallons of 7%, by weight, of sodium sulphate in water at 19 degrees centigrade, with agitation. At this point, the encapsulation of the oil with the gelled hydrophilic colloid material has taken place, and the further steps are to put it in condition for use as intended. The material is filtered and washed with water to remove the salt, the temperature being kept below the melting point of the gelatin. The filtered material is hardened by combining it with two gallons of a 37% solution of formaldehyde in water. This hardened mass then is filtered and washed to remove the residual formaldehyde. The resulting filter cake is adjusted to the proper water content by the addition of water or the removal thereof, by ordinary means, such as centrifuging or filtering or spray-drying, and the material is ready for use to coat over the attapulgite coating.

In another form of the invention, the capsular material is first coated on the paper, and then the attapulgite coating composition is coated over. This last form of the invention, with the clay on the outside coating, may have some advantage in being able to accept printing with ink, if such is desired, in addition to its being sensitive to produce the color by impact. In a still further form of the invention, to the suspended capsular material in water is added the attapulgite, directly, and beaten in, to form a paper coating of the proper viscosity, water being added, if necessary. This addition of the clay to the capsule slurry causes an interspersal of the reactant substance particles. This is applied as a coating to the paper and allowed to dry. The total weight of the coating when dry should be of the order of from 4 to 8 pounds per ream having a sheet size of 25 by 38 inches. No binder is used in this form of the invention, only one coating step is necessary, and has an advantage from a cost standpoint for that reason. Also, when no binder is used, it will not be present to interfere with the contact between the liquid containing the organic reactant and the attapulgite. All of the foregoing coatings appear white.

The chief feature of the novel record material is the presence of the liquid reactant substance encased as central nuclei in pressure-rupturable microscopic capsules of hardened film-forming hydrophilic colloid material, the walls of which capsules are impermeable to the oily liquid, and which are not subject to destruction by folding of the record material or by its exposure to unusual enviromental conditions. Nor do the capsules, by drying, crack or craze in any way to release the oil prematurely before they are ruptured by printing or writing pressures. The exterior of the capsules in this record material is in direct contact with the solid reactant particles.

The impact of a marking instrument on the surface of this novel record material locally releases the oily nuclei from the capsules and forces the oily liquid into contact with the solid reactant attapulgite particles.

The oil which is used for the capsular content need not be the trichlorodiphenyl which has been specified, but may be any of the water-immiscible oils which are inert to the other materials used in forming the capsules. Petroleum fractions like paraffin oil, vegetable oil such as castor oil, animal oil such as sperm oil and lard oil, and any other of the various synthetic oils, such as methyl-salicylate, may be used, and the reactant material may be either dissolved or dispersed in the oil.

Other organic color-reactant compounds than the crystal violet lactone and the malachite green lactone, mentioned, are found in applicant Green's United States Patent No. 2,505,470 and United States Patents Nos. 2,505,472 to 2,505,480, inclusive. Other of the inorganic compounds which may be substituted for the attapulgite or the zeolite materials are also found in these last-mentioned patents.

It is to be understood that the ingredients of the novel pressure-sensitive record material described herein are not confined to those specifically mentioned, as there are many equivalents therefor.

What is claimed is:

1. Pressure-sensitive record material consisting of a sheet of paper on a surface of which is a dry coating including, in contact with each other, microscopic oil-containing pressure-rupturable capsules of dense, oil-impermeable gelled hydrophilic-colloid material, the walls of each capsule being oil-impervious and characterized by having been deposited by coacervation forces evenly around a nucleus of oil, and microscopic particles of solid material, the oil in the capsules being water-immiscible and reactant on contact with the particles of solid material to produce a distinctive color, whereby writing and marking pressures, alone, on said record material produce distinctively colored marks at points of pressure.

2. Pressure-sensitive record material including a record material base having adherent thereto, on a side thereof, discrete microscopic marking-pressure-rupturable capsules in contact with microscopically-fine particulate solid material, each of the capsules having as a nucleus an oily, water-immiscible color reactant liquid around which, as the encapsulating material, has been deposited, by coacervation forces, a dense oil-impervious shell-like wall of hydrophilic colloid film-forming material thereafter gelled, and the particulate solid material being reactant on contact with the oily liquid to produce a distinctive color, whereby distinctively colored marks will be made upon the record material wherever marking pressures are applied to rupture the capsules, the oily liquid including an adsorbate aromatic compound having a double bond system which is convertible to a more highly polarized conjugated form upon taking part in an electron acceptor-donor surface chemical reaction, giving it a distinctive color, and the particulate material being an inorganic adsorbent which acts as an acid relative to the organic compound so as to be an electron acceptor when in adsorption contact with said organic compound.

3. The record material of claim 2, in which the record material base is paper.

4. The record material of claim 3 in which the particles and capsules are interspersed in all directions.

5. The record material of claim 3 in which the capsules are arranged in a layer next to the paper, and the particles of solid material are arranged in a layer over the capsules.

6. The record material of claim 3 in which the particles of solid material are arranged in a layer next to the paper and the capsules are arranged in a layer over the particles of solid material.

7. The record material of claim 3 in which the adherent capsules and particles of solid material form a white coating for the paper.

8. The record material of claim 2 in which the particles and capsules are interspersed in all directions.

9. The record material of claim 2 in which the capsules are arranged in a layer next to the record material base and the particles of solid material are arranged in a layer over the capsules.

10. The record material of claim 2 in which the particles of solid material are arranged in a layer next to the record material base and the capsules are arranged in a layer over the particles of solid material.

11. The record material of claim 2, in which the adherent capsules and particles of colloid material form a white coating for the record material.

12. The record material of claim 2, in which the oil cotains a colorless material which reacts with the solid particles to produce the color.

13. The record material of claim 12, in which the oil is inert as to the other ingredients.

References Cited in the file of this patent

UNITED STATES PATENTS

| 2,183,053 | Taylor | Dec. 12, 1938 |
| 2,410,110 | Taylor | Oct. 29, 1946 |
| 2,505,481 | Green | Apr. 25, 1950 |
| 2,550,473 | Green | Apr. 24, 1951 |